United States Patent [19]

Ulin

[11] 4,135,084
[45] Jan. 16, 1979

[54] TAPE DRIVE SENSOR

[75] Inventor: Carl-Otto Ulin, Järfälla, Sweden

[73] Assignee: U.S. Philips Corporation, New York, N.Y.

[21] Appl. No.: 737,599

[22] Filed: Nov. 1, 1976

[30] Foreign Application Priority Data

Nov. 5, 1975 [SE] Sweden .............................. 7512361

[51] Int. Cl.² ............................................ G01D 5/34
[52] U.S. Cl. .................................. 250/231 R; 242/57; 242/75.52
[58] Field of Search ............. 73/136 B; 242/57, 75.52; 250/231 R

[56] References Cited

U.S. PATENT DOCUMENTS

| 1,919,607 | 7/1933 | Thompson | 242/57 X |
| 2,147,711 | 2/1939 | Martin | 73/136 B |
| 3,263,038 | 7/1966 | Walker | 242/57 X |
| 3,497,158 | 2/1970 | Calaway | 242/75.52 X |
| 3,938,890 | 2/1976 | Flavell | 250/231 R X |

Primary Examiner—Lawrence J. Dahl
Attorney, Agent, or Firm—David R. Treacy

[57] ABSTRACT

A device for sensing the torque of a tape driving shaft transferred to a driven shaft, and indicating absence of tape to be driven. The shafts are resiliently coupled, and apertured opaque discs are coupled to the respective shafts. Radiation emitting and sensing elements on a movable bifurcated arm are held by the tape in alignment with the disc apertures to sense torque, and are moved clear of the discs if no tape is present.

2 Claims, 4 Drawing Figures

TAPE DRIVE SENSOR

BACKGROUND OF THE INVENTION

1. Field of the Invention

The invention relates to a device for sensing a torque transferred from a driving axis, which is driven by a driving means, to a driven axis which is coupled to said driving axis; and more particularly to such a device used to drive a tape. A particular application is tape readers for reading of punched tapes, and similar apparatus which present problems with respect to tape feeding.

Teleprinter and similar tapes of this type are manufactured by punching a paper tape which is 17.40 or 25.40 mm. wide. During the punching operation the tape is provided with patterns of holes each representing a character. The punched tape also has a longitudinal line of equidistant feeding holes which are engaged by teeth of a toothed feeding wheel.

During reading the punched tape is fed forward past a reading head provided in the tape reader, which head may read the punched holes mechanically or optically. The detailed construction of the reading head is unrelated to for the invention and therefore not further described.

From the foregoing it will be clear that the punched tape is fragile so that a break of the tape or damage to the holes provided therein may readily occur if further supply of the tape is prevented although feeding by the feeding wheel is continued.

When using a tape reader of this type in telex applications the punched tapes are normally handled manually and supplied to the tape reader during reading without being closely controlled. Since a telex apparatus is ordinarily placed on a table the punched tape will usually hang down more or less freely from the input of the tape reader. When the punched tape is very long it will frequently lie in a heap which is more or less in disorder on the floor near the telex apparatus.

From this is clear that the probability of tape stagnation is great and that it is desirable to eliminate the risk of overstressing the punched tape and damaging it.

2. Description of the Prior Art

In order to eliminate this problem in punched tape readers it is previously known to provide a yoke or a roller over which the tape runs during feeding. Such a yoke or roller is supported resiliently so that it will be displaced when stretching of the tape exceeds a predetermined value. The movement of the yoke or roller obtained thereby may be used so as to break the feeding of the punched tape, for example by inactivation of the driving means provided for the feeding wheel.

A yoke or roller of the mentioned type as normally arranged projects from the tape reader and is therefore not a good solution from the standpoint of construction or use. Embodiments thereof which are more or less "built in" are already known. All of these constructions have the disadvantage that introduction of punched tape into the tape reader is more or less complicated.

These prior art devices do not provide a good technical solution to the problem of sensing the extension strain or stretching of the punched tape from a functional point of view either. Primarily this is due to the fact that the function of the prior art devices is based upon sensing of the punched tape at a position which is at a relatively great distance before the engagement point of the feeding wheel, so that damage or errors in the punched tape revealing themselves only when the input of the tape reader is reached, or in connection with the toothed wheel, such as a rip partly across the width of the tape, are not discovered and therefore may cause a break in the tape and the inconveniences which follow therefrom, such as increased transmission time, necessity for corrections etc.

SUMMARY OF THE INVENTION

The object of the invention is to provide a device which avoids the problems of tape readers described above.

In a device according to the invention two cooperative discs or plates are positioned opposite to each other, one of the disc being connected to a driving member or shaft and the other to a driven member or shaft, each disc being provided with apertures or slots (hereinafter referred to, for simplicity, as apertures) with opaque areas therebetween, the apertures preferably arranged equidistantly and substantially along a circle concentric with the centers of the discs; the driving shaft is resiliently connected to the driven shaft by a torque transfer means arranged so as, in a normal condition, to keep the discs in a relative angular position such that the apertures of one disc covered by the opaque areas of the other disc an indicating member having one radiation emissive and one radiation sensitive element, positioned on respective different sides of the set of discs and at the level of the apertures, so that an indication is obtained when radiation is allowed to pass through the apertures as a consequence of a changed relative angular position of the discs.

By arranging the device according to the invention between the feeding wheel and the driving shaft or axis in a tape reader the desirable sensing of the strain in the punched tape at the level of the engagement point of the feeding wheel is achieved. The radiation sensitive element provided therein may, for example, be arranged so that when activated by incident radiation it closes a current path which inactivates the driving means.

For tape readers it is also generally desirable that feeding of the punched tape should be stopped at the end of the tape. This may be achieved by a preferred embodiment of the invention which is especially intended for feeding a ribbon or a tape in an apparatus, in which the indicating member is arranged on a two-armed bifurcated or fork-shaped part having the radiation emissive element on one arm and the radiation sensitive element on the other, and the fork-shaped part is arranged so as to be movable between a first position in which the elements are at the level of the apertured portions of the discs and a second position in which radiation is allowed to pass by the edges of the discs and onto the radiation sensitive element. A spring continuously biases or urges the fork-shaped part toward the second position, and a contact protuberance by contacting a ribbon or tape (hereinafter generally referred to as a tape) present in the apparatus keeps the fork shaped part in the first position. When the end of the tape is reached the spring displaces the forked part to said second position. This embodiment of the invention allows a more effective use of the radiation elements and eliminates the need for a separate device for detecting the end of the tape.

The invention will be described in detail hereinafter with reference to the drawing.

DESCRIPTION OF THE PREFERRED EMBODIMENT

Corresponding parts of the device of the different figures have identical reference numbers.

Figure 1:
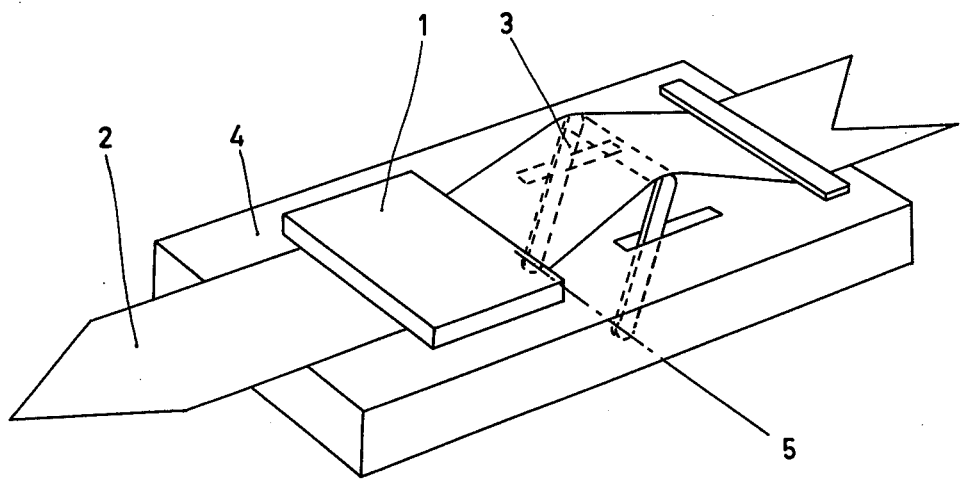
FIG. 1 is a schematic perspective view of a prior art device for sensing the strain of a punched tape in a tape reader.

The tape reader which is shown schematically in FIG. 1 has a hinged portion 1 of a reading head and a feeding wheel (not shown) under the reading head to drive a punched tape 2 in the direction indicated. On the input side the punched tape 2 will pass over a resiliently supported yoke 3. When the strain in the tape is increased, for example because the input end has been caught, the yoke 3 is displaced downwards in the direction of the base plate 4 while rotating about an axis 5. The yoke movement may then be used to interrupt the feeding of the punched tape. The functional disadvantages of prior art devices is clear: the fact that the sensing of the tape is carried out at a given distance before the engagement point between the feeding wheel and the punched tape.

Figure 2:
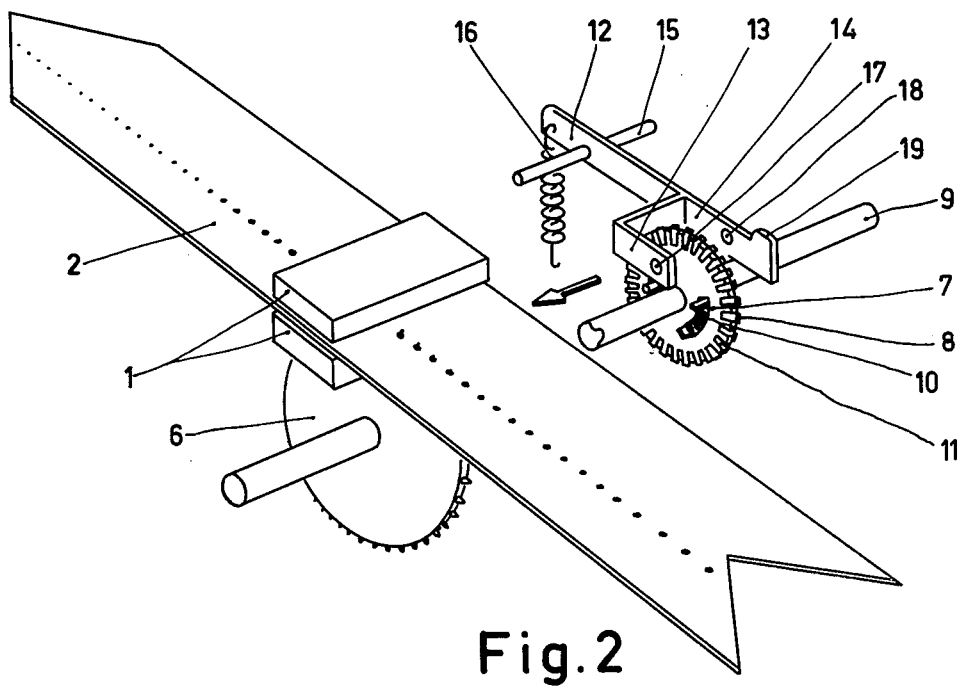
FIG. 2 is a schematic perspective view of the relevant parts of a tape reader according to the invention.

In FIG. 2 the principal parts of a tape reader according to the invention as shown. As in FIG. 1 the punched tape 2 is fed forward past a reading head 1, by means of a toothed feeding wheel 6. The reading head 1 may for example be an optical type, in which the upper part of the reading head normally has eight light-emitting diodes arranged along a line transverse to the punched tape, and the lower part has the same number of photo-transistors each positioned below a corresponding diode.

The torque sensing device according to the invention has two adjacent discs 7, 8, which are connected respectively to the shaft of the feeding wheel 6 and a driving shaft 9, the driving shaft 9 being rotated step-by-step by a driving means (not shown). The discs are coupled to each other by a torsionally resilient means in the form of a spring 10. Along the edge each disc has equidistant apertures or slots 11. A bifurcated part or fork 12 having two arms 13, 14 is pivotable around an axis 15 and is biased by a spring 16, tending to move the fork upward. The arms 13, 14 carry a light-emitting diode 17 and a phototransistor 18 respectively, aligned opposite each other at different sides of the discs 7, 8. They may be of the same type as the light-emitting diodes and the photo transistors used in the reading head mentioned above. The arm 14 is provided with a contact proturberance 19 which is pressed upward against the punched tape by the spring 16 in a manner such that the light-emitting diode 17 and the photo-transistor 18 are thereby brought to the level of the slots 11 of the discs 7, 8. In a practical embodiment of the tape reader the discs 7, 8 and the fork 12 are both positioned below the punched tape so that the protuberance 19 is in contact with the lower side of the punched tape. For the sake of clarity in the drawing, however, these parts have been shown off to one side.

The function of the device is as follows: During feeding of the punched tape 2 by the feeding wheel 6 and the driving shaft 9 the protuberance 19 is in contact with the lower side of the punched tape. Upon jamming or other stoppage of the tape the feeding wheel 6 will stop and therefore also the disc 7, but the rotation of the disc 8 is continued so that a passage for the radiation emitted by the light-emitting diode 17 to the photo transistor 18 is opened through the slots 11. The photo transistor 18 which is activated thereby will then inactivate the actual driving means. When the end of the tape is reached the protuberance 19 will lose contact with the tape and the fork 12 is then displaced in the upward direction by the spring 16, and thereby radiation emitted by the light-emitting diode 17 can pass on to the photo transistor 18 past the edge of the discs 7, 8 and consequently inactivate the driving means.

Figure 3:
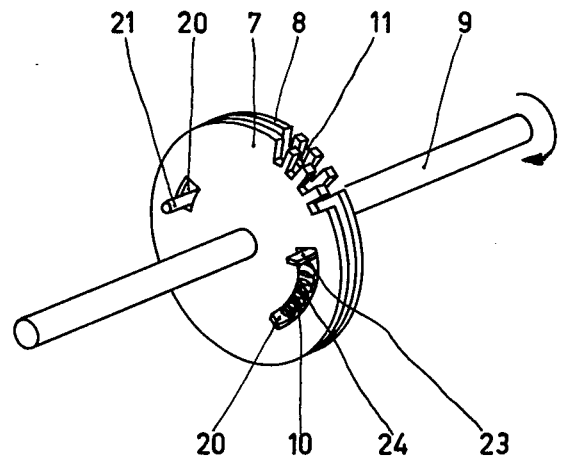
FIG. 3 is a perspective view of the discs of FIG. 2 in greater detail.

In FIG. 3 the two discs 7, 8 of FIG. 2 are shown in more detail, including of the slots 11 provided radially along the periphery. The primary requirement to be fulfilled by the slots and the opaque areas between them is that the slots of the one disc should be covered by the opaque areas of the other disc, and conversely, when the discs are in a relative angular position which is determined by the normal feeding condition. This so-called normal condition is determined by a slot 20 in the form of a segment of a circle in the disc 7 and through which a pin 21, which is rigidly arranged on the disc 8, is inserted. The torque transfer spring 10 is at one end in contact with a projecting part 22 of the disc 7 and at the other end with a portion 23 of the disc 8, the portion 23 being inserted through a further slot 24 in the shape of a segment of a circle in the disc 7. By means of the spring 10 the pin 21 is kept pressed against one end of the slot 20, defining the normal condition. In operation the disc 8 is rotated in the direction indicated by the arrow. The disc 7 is carried along by means of the spring 10. When the disc 7 is stopped the rotation of the disc 8 will be continued so that the discs are rotated relative to each other and a passage for the radiation is opened via the slots 11.

Figure 4:
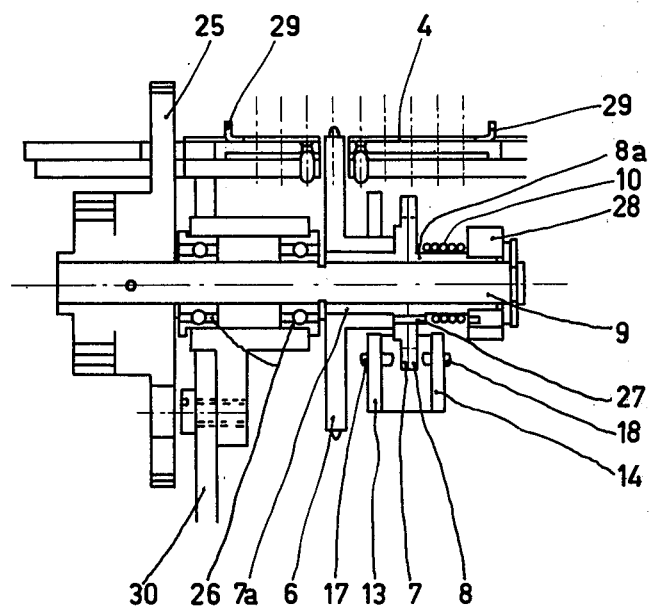
FIG. 4 is a cross-section of another embodiment of the invention.

FIG. 4 shows a cross-section of a practical embodiment of the device according to the invention in a tape reader. The base plate 4 is provided with guiding means 29 for the tape. The toothed feeding wheel 6 protrudes through an opening of the base plate. One so called thumb wheel 24, which is used when the punched tape is inserted, is also protruding through the base plate 4 adjacent to the guiding means 29. The driving shaft is mounted on bearings 26, which are carried by a metal plate 30 forming part of the frame of the tape reader. The sensing disc 7 is rigidly connected to the feeding wheel 6 via the bushing 7a, which is rotatable around the driving shaft 9. The disc 8 is rigidly connected to the driving shaft 9 via the bushing 8a, and the connection piece 28. The torque transfer spring 10 is provided around the bushing 8a, and one end thereof is rigidly connected to the connection piece 28 by a needle or the like and the other end thereof is rigidly connected to the disc 7 by a needle 27 connected to the disc 7 and protruding through a circular segment slot in the disc 8 (compare the pin 21 and the slot 20 of FIG. 3). From this it follows that the needle 27 has the function of both a position limiting member which determines the normal condition of the discs 7, 8 and as a connection piece for the spring 10. The circular has a length such that the spring 10 allows the desired given relative rotation of the plates 7, 8.

FIG. 4 further shows the arms 13, 14 of the fork 12, carrying the light-emitting diode 17 and the photo transistor 18, respectively, in the normal condition, at the level of the slots provided along the periphery of the discs 7, 8.

What is claimed is:

1. A device for sensing torque in a tape drive apparatus and indicating absence of tape at a sensing zone of the apparatus, comprising a driven member mounted to the apparatus for rotation about an axis, means for driving a tape in the apparatus, drivingly coupled to said driven member, a driving member for applying driving torque about said axis, torsionally resilient means for coupling the driving member to the driven member, first and second apertured opaque discs coupled to said driving and driven members respectively for rotation therewith, said discs being so arranged that, when the torque exerted by the driving member is within a normal range, apertures in the first disc are aligned opposite corresponding opaque regions of the second disc; and when the torque exerted by the driving member is greater than said normal range, apertures in the first and second discs are at least partially aligned opposite each other, and indicating means comprising a bifurcated part having first and second arms; a radiation emitting element mounted to the first arm; a radiation receiving element mounted to the second arm; means for mounting said part for movement between a first position in which the apertured portions of the first and second discs pass between the radiation emitting and radiation receiving elements, and a second position in which radiation from the emitting element can pass by the discs; means for biasing said part toward the second position; and means responsive to presence of tape at the sensing zone of the apparatus for holding said bifurcated part in the first position.

2. A device for sensing torque as in claim 1, wherein said means for mounting comprises pivotal means for positioning the bifurcated part with at least one arm disposed in the sensing zone under a path traversed by tape being driven through the apparatus, and said means for holding includes a protuberance on said at least one arm.

* * * * *